UNITED STATES PATENT OFFICE.

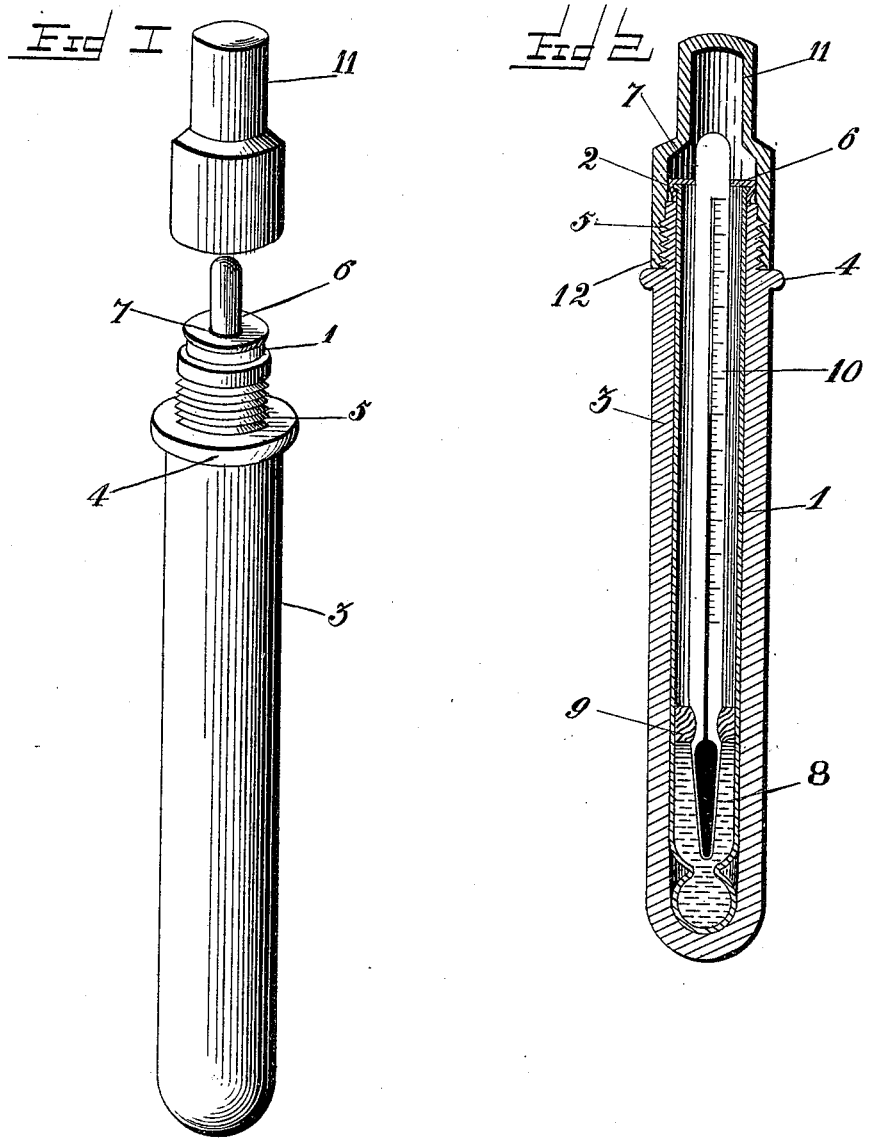

JOHN McKELVEY GRAY, OF PORT CARBON, PENNSYLVANIA.

THERMOMETER-CASE.

SPECIFICATION forming part of Letters Patent No. 641,856, dated January 23, 1900.

Application filed March 1, 1899. Serial No. 707,314. (No model.)

*To all whom it may concern:*

Be it known that I, JOHN McKELVEY GRAY, a citizen of the United States, residing at Port Carbon, in the county of Schuylkill and State of Pennsylvania, have invented a new and useful Thermometer-Case, of which the following is a specification.

This invention relates to cases for thermometers used by physicians in taking the temperature of patients, and has for its object to provide an improved case adapted to contain the thermometer and a suitable antiseptic solution, whereby contagion following the repeated use of the thermometer is obviated.

A further object is to provide means whereby the stem of the thermometer is wiped and dried of the antiseptic liquid each time the thermometer is drawn out of the case.

To these ends the present invention consists in the combination and arrangement of parts, as will be hereinafter more fully described, shown in the accompanying drawings, and particularly pointed out in the appended claim.

In the drawings, Figure 1 is a perspective view of the case, the cover or cap being removed. Fig. 2 is a longitudinal sectional view, the cap being in place.

Corresponding parts are designated by like reference characters in both figures of the drawings.

Referring to the accompanying drawings, 1 designates a glass tube closed at its lower end, open at its top, and provided with an exterior bead 2. This tube is snugly incased within an exterior shell or casing 3, having an exterior annular shoulder 4, provided near the open end of the shell, which is exteriorly threaded, as at 5, beyond the shoulder. The open end of the glass tube 1 projects beyond the open threaded end of the shell or casing 3, and a rubber or other suitably-elastic cap 6 is sprung over the bead 2 about the mouth or open end of the glass tube. A central opening or perforation 7 is provided through the top of this cap.

An antiseptic solution 8 is provided in the lower portion only of the glass tube, and cotton or other suitable absorbent filling 9 is fitted within the tube and in contact with the surface of the solution to prevent evaporation and spilling of the same. The thermometer 10 is forced downward through the opening in the rubber cap 6 until the bulb end of the thermometer is forced through the absorbent into the solution, whereby the thermometer is held or supported at its lower end against lateral movement by the filling 9. The stem of the thermometer is of a length to project through the opening in the rubber cap and beyond the same, so that the thermometer may be easily removed from its case. The opening in the rubber cap is smaller than the diameter of the stem of the thermometer, whereby the latter is gripped by the cap and held firmly against accidental movement either laterally or longitudinally. It will thus be seen that the bulb only of the thermometer is in contact with the antiseptic solution, while the stem is entirely out of contact with said solution. This arrangement is advantageous in view of the fact that only the bulb portion of the thermometer is applied to the patient, and therefore it is only the bulb that requires the antiseptic. By applying the antiseptic to the bulb only unnecessary loss of such antiseptic is prevented, as but a small portion of the thermometer is in contact therewith.

A cover 11, internally threaded, as at 12, is adapted to be fitted to the externally-threaded portion of the shell or casing 3 and screwed down against the annular shoulder 4, closing the open ends of the glass tube and shell, respectively, protecting the antiseptic against evaporation, and completing the case.

When the thermometer is being drawn out of the case, the edges of the opening in the elastic cap will wipe the antiseptic solution from the stem of the thermometer, leaving the same dry and in condition for immediate use, the antiseptic having rendered the thermometer free from the danger of contagion.

It will be noted that the rubber or other elastic cap 6 firmly grips the annular bead 2 on the glass tube, whereby the cap is prevented from being displaced by the withdrawing of the thermometer. As the glass tube projects beyond the hard-rubber casing, a new cap may readily be substituted for an old one without the necessity of removing the tube from its casing.

The parts of the device are few in number, all of which are firmly connected together, and the thermometer is prevented from being broken.

Changes in the form, proportion, size, and the minor details of construction within the scope of the appended claim may be resorted to without departing from the spirit or sacrificing any of the advantages of this invention.

It will be noted that the cap of the casing has its upper portion contracted, which results in the formation of an inwardly-directed shoulder, which lies above the upper end of the tube and in position to be engaged by the elastic cap upon the tube in the event of the tube moving outwardly of the casing when the cap is in place. This prevents engagement of the thermometer with the cap and prevents breakage.

Having thus described the invention, what is claimed is—

The combination with a casing having an open upper end, of a tube disposed within the casing and projecting above the upper end thereof, a bead upon the projecting end of the tube, a rubber cap engaged over the bead and having a central perforation, a cap for the casing adapted for engagement therewith and having a narrowed upper portion resulting in the formation of a shoulder which extends inwardly beyond the upper end of the tube and in the path of outward movement thereof, whereby the shoulder will receive contact of the rubber cap when the tube is moved outwardly of the casing, an antiseptic solution within the bottom of the tube, and a filling snugly filling the tube upon the upper surface of the solution and adapted to cover the solution and to permit the passage of a thermometer therethrough and into the solution, said thermometer being adapted to pass through the perforation in the rubber cap and having a diameter greater than the normal diameter of the perforation, said thermometer being adapted to lie in a position to be free from engagement with the end of the cap of the casing when the tube is moved outwardly and into engagement with the shoulder of the cap.

In testimony that I claim the foregoing as my own I have hereto affixed my signature in the presence of two witnesses.

JOHN McKELVEY GRAY.

Witnesses:
WM. S. LEIB,
JOHN W. LUGAN.